United States Patent Office 3,041,361
Patented June 26, 1962

3,041,361
PREPARATION OF NORMAL LEAD STYPHNATE
Julius M. Komarmy, Fayetteville, Ark., assignor, by mesne assignments, to the United States of America as represented by the Secretary of the Navy
No Drawing. Filed May 9, 1955, Ser. No. 507,134
2 Claims. (Cl. 260—435)

This invention relates to a new process for the preparation of normal lead styphnate.

The importance of lead styphnate in the explosives industry, particularly as an ingredient of priming and detonating compositions, stresses the importance of the availability of normal lead styphnate in a pure form for a comprehensive study of its physical properties. Furthermore, it is desirable to have available a method for the preparation of normal lead styphnate which can be adapted to the formation of conductive mixes to be used in electrical initiators.

In prior processes for the preparation of normal lead styphnate, the reactants, of whatever character, have generally been reacted in water solution. This procedure has the disadvantage that a large amount of solvent in proportion to the product is required, thus entailing a cumbersome and inefficient manufacturing process and requiring a large amount of bulky and expensive equipment. Furthermore, most prior processes required the use of a crystallizing agent, thus adding to the difficulty of obtaining a pure product. For example, one preparation process consisted in reacting lead nitrate with an alkali metal or alkaline earth metal salt of styphnic acid in hot solution with the use of acetic acid as a crystallizing agent.

It is an object of this invention to provide a method for the production of normal lead styphnate in which the use of large amounts of solvent are avoided.

It is another object of this invention to provide a process for the manufacture of normal lead styphnate which does not require the use of a crystallization agent.

It has been found that the above and other objects are accomplished by dissolving styphnic acid in glycerol and adding an alkali metal hydroxide or ammonium hydroxide to give a pH of about 5, followed by the addition of lead nitrate, the steps being performed in the recited order.

The operation of the process of the invention is illustrated by the following example. Eleven grams of styphnic acid were dissolved in a glycerol-base solvent and the pH of the solution adjusted by the addition of sodium hydroxide until a pH value of about 5 was obtained. Thirteen grams of lead nitrate were then added slowly with stirring to the styphnic acid-glycerol solution resulting in the formation of a gelatinous precipitate. A small amount of water was added and the mixture stirred until the mass crystallized into needle-like crystals of normal lead styphnate. The precipitate was washed and dried by the usual procedures. The compound was identified by lead and carbon analysis and by X-ray diffraction patterns. Ammonium or potassium hydroxide may be substituted for sodium hydroxide in the process. It was found that lead acetate may be used in the process instead of lead nitrate. The recited order of the above steps of the process are important for the production of pure normal lead styphnate.

The chief advantages of the process of the invention are that relatively smaller volumes of solvent are required to obtain the same amount of product because of the much higher solubility of the reactants in glycerol than in water and the fact that the use of a crystllization agent to induce precipitation is avoided.

Obviously, many modifications and variations of the present invention are possible in the light of the above teachings. It is therefore to be understood that within the scope of the appended claims, the invention may be practiced otherwise than as specifically described.

What is claimed is:

1. The process for preparing normal lead styphnate which comprises the steps of dissolving styphnic acid in glycerol, adjusting the pH of the solution to about 5 by the addition of a material from the class consisting of an alkali metal hydroxide and ammonium hydroxide, and adding a material from the class consisting of lead acetate and lead nitrate.

2. The process for preparing normal lead styphnate which comprises the following steps performed in the recited order: Dissolving styphnic acid in an excess of glycerol, adjusting the pH of the solution to about 5 by the addition of a material from the class consisting of an alkali metal hydroxide and ammonium hydroxide, and adding lead nitrate until normal lead styphnate crystallizes from the solution.

References Cited in the file of this patent

UNITED STATES PATENTS

| | | |
|---|---|---|
| 1,999,728 | Herz | Apr. 30, 1935 |
| 2,137,234 | Brun | Nov. 22, 1938 |
| 2,202,647 | Brun | May 28, 1940 |
| 2,589,703 | Kenney | Mar. 18, 1952 |